United States Patent
Wu

(10) Patent No.: US 8,432,416 B2
(45) Date of Patent: Apr. 30, 2013

(54) METHOD FOR ADJUSTING PAGE DISPLAY MANNER, MOBILE ELECTRONIC DEVICE, AND STORAGE MEDIUM THEREOF

(75) Inventor: Kun-Da Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 924 days.

(21) Appl. No.: 12/534,863

(22) Filed: Aug. 4, 2009

(65) Prior Publication Data

US 2010/0097400 A1  Apr. 22, 2010

(30) Foreign Application Priority Data

Oct. 17, 2008 (TW) .............................. 97140053 A

(51) Int. Cl.
*G09G 5/00* (2006.01)
(52) U.S. Cl.
USPC ........................................................ 345/661
(58) Field of Classification Search .................. None
See application file for complete search history.

(56) References Cited

U.S. PATENT DOCUMENTS

| | | | |
|---|---|---|---|
| 5,943,679 A * | 8/1999 | Niles et al. ................ 715/247 |
| 6,567,102 B2 | 5/2003 | Kung | |
| 6,909,439 B1 | 6/2005 | Amro et al. | |
| 7,064,858 B2 * | 6/2006 | Iwai et al. .................... 358/1.2 |
| 7,248,269 B2 * | 7/2007 | Card et al. .................... 345/660 |
| 7,385,725 B1 * | 6/2008 | Sawyer ........................ 358/1.18 |
| 7,707,495 B2 * | 4/2010 | Hosotsubo ................... 715/243 |
| 7,920,112 B2 * | 4/2011 | Kurihara et al. ............... 345/84 |
| 2003/0052900 A1 * | 3/2003 | Card et al. .................... 345/660 |
| 2004/0177324 A1 * | 9/2004 | Simmons et al. ............. 715/530 |
| 2005/0195316 A1 | 9/2005 | Kollias et al. | |
| 2006/0077179 A1 | 4/2006 | Hsu et al. | |
| 2006/0103629 A1 * | 5/2006 | Seet et al. ..................... 345/156 |
| 2006/0156227 A1 * | 7/2006 | Hosotsubo .................... 715/517 |
| 2007/0162868 A1 | 7/2007 | Vignet | |
| 2007/0236475 A1 | 10/2007 | Wherry | |

(Continued)

FOREIGN PATENT DOCUMENTS

CN 1475970 2/2004
EP 1847924 10/2007

(Continued)

OTHER PUBLICATIONS

Liu, Yang, "A Zooming Browser Design Based on a Layered Structure", Northwestern Poly Technical University Thesis of Master Degree, Dec. 31, 2006, pp. 1-7.

(Continued)

*Primary Examiner* — Ryan R Yang
(74) *Attorney, Agent, or Firm* — Jianq Chyun IP Office

(57) ABSTRACT

A method for adjusting a page display manner, a mobile electronic device, and a storage medium thereof are provided. In the present method, a scaling signal is first received. Then, a display ratio of a page in a touch screen is adjusted according to a variation of the scaling signal. If the display ratio is smaller than or equal to a specific ratio, the page is adjusted according to the display ratio and other open pages are displayed along with the page on the screen. Thereby, a user can resize the page, inspect all the open pages, and switch between all the open pages simply through the touch screen. As a result, it is made very convenient to browse multiple pages by using the mobile electronic device.

16 Claims, 6 Drawing Sheets

U.S. PATENT DOCUMENTS

| | | | |
|---|---|---|---|
| 2008/0129757 A1* | 6/2008 | Tanaka et al. | 345/660 |
| 2008/0235612 A1 | 9/2008 | Nakagawa | |
| 2008/0288894 A1* | 11/2008 | Han et al. | 715/855 |

FOREIGN PATENT DOCUMENTS

| | | |
|---|---|---|
| TW | 513657 | 12/2002 |
| TW | 200614057 | 5/2006 |
| TW | I296395 | 5/2008 |
| WO | 2006137166 | 12/2006 |

OTHER PUBLICATIONS

"First Office Action of China Counterpart Application", issued on May 25, 2011, p. 1-p. 5.

"Search Report of European Counterpart Application", issued on Jul. 8, 2010, p. 1-p. 4.

Anonymous (author): "Download Actual Window Manager/Achieve of previous Versions/Version 5.2"[Online] Oct. 14, 2008, XP002583381 Actualtools Retrieved from the Internet: URL://http://www.actualtools.com/windowmanager/download/>[retrieved on May 18, 2010].

"1st Office Action of European Counterpart Application", issued on Jul. 22, 2010, p. 1-p. 7.

"Notice of Allowance of Taiwan Counterpart Application", issued on Mar. 26, 2012, p. 1-p. 4.

"Summons to attend oral proceedings of Europe Counterpart Application", issued on Dec. 18, 2012, p1-p13, in which the listed reference was cited.

* cited by examiner

METHOD FOR ADJUSTING PAGE DISPLAY MANNER, MOBILE ELECTRONIC DEVICE, AND STORAGE MEDIUM THEREOF

CROSS-REFERENCE TO RELATED APPLICATION

This application claims the priority benefit of Taiwan application serial No. 97140053, filed on Oct. 17, 2008. The entirety of the above-mentioned patent application is hereby incorporated by reference herein and made a part of this specification.

BACKGROUND OF THE INVENTION

1. Field of the Invention

The present invention generally relates to a page display method, and more particularly, to a method for adjusting a page display manner, a mobile electronic device, and a storage medium thereof.

2. Description of Related Art

The development of mobile electronic devices has been going toward multi-functionality along with the development of mobile technology. For example, a cell phone can also be used for editing documents, browsing the Internet, or playing multimedia files besides being used for making phone calls and sending/receiving short messages. However, other than the multi-functionality, today's consumers also require a mobile electronic device to have an attractive appearance. Thereby, the design of mobile electronic devices is also going towards lightness, slimness, shortness, and smallness.

However, the slim and small appearance of a mobile electronic device will definitely limit the size of the screen on the mobile electronic device. As a result, when a user uses the mobile electronic device to browse a document, a web page, or even a picture, the user has to resize the displayed document, web page, or picture to see the entire or part of the document, web page, or picture in the limited screen. However, even though the page resizing function has been implemented in many existing cell phone software, these implementations do not allow a user to resize a page in a touch screen through simple and intuitional movements on the touch screen.

For example, even though the conventional screens have been replaced by touch screens in more and more cell phones, most cell phone software still require a user to use both the actual buttons on such a cell phone and the touch screen thereof to resize a page displayed in the touch screen, and once the page scaling function is started, the user can adjust the display ratio of the page by using virtual buttons displayed in the touch screen. However, the page can only be adjusted to fixed display ratios, and when the user needs to inspect other open pages, the user has to switch between a single-page display mode and a multi-page display mode by pressing down the actual buttons on the cell phone. Accordingly, it is very inconvenient for the user to move his finger between the actual buttons and the touch screen, and the operations of the user on the cell phone are made very clumsy.

SUMMARY OF THE INVENTION

Accordingly, the present invention is directed to a method for adjusting a page display manner, wherein the operations of resizing a page, displaying a single or multiple pages, and switching between multiple open pages can be accomplished through a single signal input unit.

The present invention is directed to a mobile electronic device, wherein the operations of resizing a page and displaying all open pages can be accomplished through a single signal input unit.

The present invention is directed to a storage medium which makes the operations of resizing a page and switching between multiple pages very convenient and does not produce any interruption when a user browses a page.

The present invention provides a method for adjusting a page display manner, wherein the method is suitable for adjusting a page displayed in a screen. First, a scaling signal is received. Then, a display ratio of the page on the screen is adjusted according to a variation of the scaling signal. When the display ratio is smaller than or equal to a specific ratio, other open pages are displayed along with the currently displayed page according to the display ratio.

According to an embodiment of the present invention, after the step of receiving the scaling signal, the method further includes determining whether the scaling signal is located within a specific area of the screen and adjusting the display ratio of the page on the screen according to the variation of the scaling signal if the scaling signal is located within the specific area.

According to an embodiment of the present invention, the method further includes displaying a page scale prompt while receiving the first scaling signal, serving a display area of the page scale prompt as the specific area, and determining whether the second scaling signal is located within the specific area while receiving the second scaling signal.

According to an embodiment of the present invention, after the step of determining whether the second scaling signal is located within the specific area, the method further includes displaying a page scale adjusting interface for receiving the third scaling signal and adjusting the display ratio of the page on the screen according to a variation of the third scaling signal.

According to an embodiment of the present invention, the page scale prompt and the page scale adjusting interface may be roll scroll bars, Fraxel touch knobs, or touch buttons, etc.

According to an embodiment of the present invention, the step of adjusting the display ratio of the page according to the variation of the scaling signal includes obtaining a displacement and a direction of a track produced by the scaling signal to correspondingly adjusting the display ratio.

According to an embodiment of the present invention, the step of adjusting the display ratio of the page according to the variation of the scaling signal includes uninterruptedly obtaining a displacement and a direction of a track produced by the scaling signal to linearly adjust the display ratio.

According to an embodiment of the present invention, the step of adjusting the display ratio of the page according to the variation of the scaling signal includes obtaining an occurrence number of the scaling signal to adjust the display ratio.

According to an embodiment of the present invention, the method further includes adjusting the sizes of the other open pages according to the display ratio.

According to an embodiment of the present invention, the specific ratio may be an original ratio or a minimum ratio, wherein the minimum ratio is smaller than the original ratio.

According to an embodiment of the present invention, after the step of adjusting the display ratio of the page, the method further includes individually displaying the complete page on the screen when the display ratio is equal to the original ratio, and enlarging the page according to the display ratio and displaying a part of the page on the screen when the display ratio is greater than the original ratio.

According to an embodiment of the present invention, the method further includes diminishing the page and the other open pages according to the display ratio, displaying the page on the screen, and displaying the other open pages in an area of the screen other than the display area of the page when the display ratio is smaller than the original ratio or equal to the minimum ratio.

According to an embodiment of the present invention, after the step of displaying the other open pages along with the page, the method further includes determining whether the display ratio is equal to the minimum ratio while receiving a fourth scaling signal and switching one of the open pages according to the direction of the fourth scaling signal when the display ratio is equal to the minimum ratio, wherein the minimum ratio is smaller than the specific ratio.

According to an embodiment of the present invention, the page contains at least one of a text, a picture, and a multimedia file.

According to an embodiment of the present invention, the scaling signal is generated by a touch panel or a mouse.

The present invention provides a mobile electronic device including a screen, a signal input unit, and a processing unit. The signal input unit receives a scaling signal. The processing unit is connected to the screen and the signal input unit. The processing unit adjusts a display ratio of a page on the screen according to a variation of the scaling signal and displays other open pages on the screen along with the currently displayed page if the display ratio is smaller than or equal to a specific ratio.

According to an embodiment of the present invention, the processing unit further determines whether the scaling signal is located within a specific area of the screen and adjusts the display ratio of the page on the screen according to the variation of the scaling signal if the scaling signal is located within the specific area.

According to an embodiment of the present invention, the processing unit further displays a page scale prompt on the screen when the signal input unit receives the first scaling signal, serves the display area of the page scale prompt as the specific area, and when the signal input unit receives the second scaling signal, determines whether the second scaling signal is located within the specific area.

According to an embodiment of the present invention, the processing unit displays a page scale adjusting interface on the screen when the second scaling signal is located within the specific area, and when the signal input unit receives the third scaling signal, the processing unit adjusts the display ratio of the page on the screen according to the variation of the third scaling signal.

According to an embodiment of the present invention, the page scale prompt and the page scale adjusting interface may be roll scroll bars, Fraxel touch knobs, or touch buttons.

According to an embodiment of the present invention, the processing unit obtains a displacement and a direction of a track produced by the scaling signal to correspondingly adjust the display ratio.

According to an embodiment of the present invention, the processing unit uninterruptedly obtains a displacement and a direction of a track produced by the scaling signal to linearly adjust the display ratio.

According to an embodiment of the present invention, the processing unit obtains an occurrence number of the scaling signal to adjust the display ratio.

According to an embodiment of the present invention, the processing unit adjusts the sizes of the other open pages according to the display ratio.

According to an embodiment of the present invention, the specific ratio is an original ratio or a minimum ratio, wherein the minimum ratio is smaller than the original ratio.

According to an embodiment of the present invention, the processing unit individually displays the complete page on the screen when the display ratio is equal to the original ratio, and the processing unit enlarges the page according to the display ratio and displays a part of the page on the screen when the display ratio is greater than the original ratio.

According to an embodiment of the present invention, the processing unit diminishes the page and the other open pages according to the display ratio, displays the page on the screen, and displays the other open pages in an area of the screen other than the display area of the page when the display ratio is smaller than the original ratio or equal to the minimum ratio.

According to an embodiment of the present invention, the processing unit determines whether the display ratio is equal to the minimum ratio when the signal input unit receives the fourth scaling signal and switches one of the open pages according to the direction of the fourth scaling signal when the display ratio is equal to the minimum ratio, wherein the minimum ratio is smaller than the specific ratio.

According to an embodiment of the present invention, the page contains at least one of a text, a picture, and a multimedia file.

According to an embodiment of the present invention, the signal input unit is a touch panel or a mouse.

The present invention provides a storage medium which is suitable for loading program instructions into a mobile electronic device to allow the mobile electronic device to execute foregoing method for adjusting a page display manner.

In the present invention, a currently displayed page is resized according to an operation performed by a user on a screen, and when a display ratio of the page is smaller than an original ratio or equal to a minimum ratio, other open pages are displayed on the screen along with the currently displayed page so that the user can switch between the pages conveniently. Thus, the operations of resizing and switching between the pages are made very convenient and the user can browse the displayed pages without any interruption.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
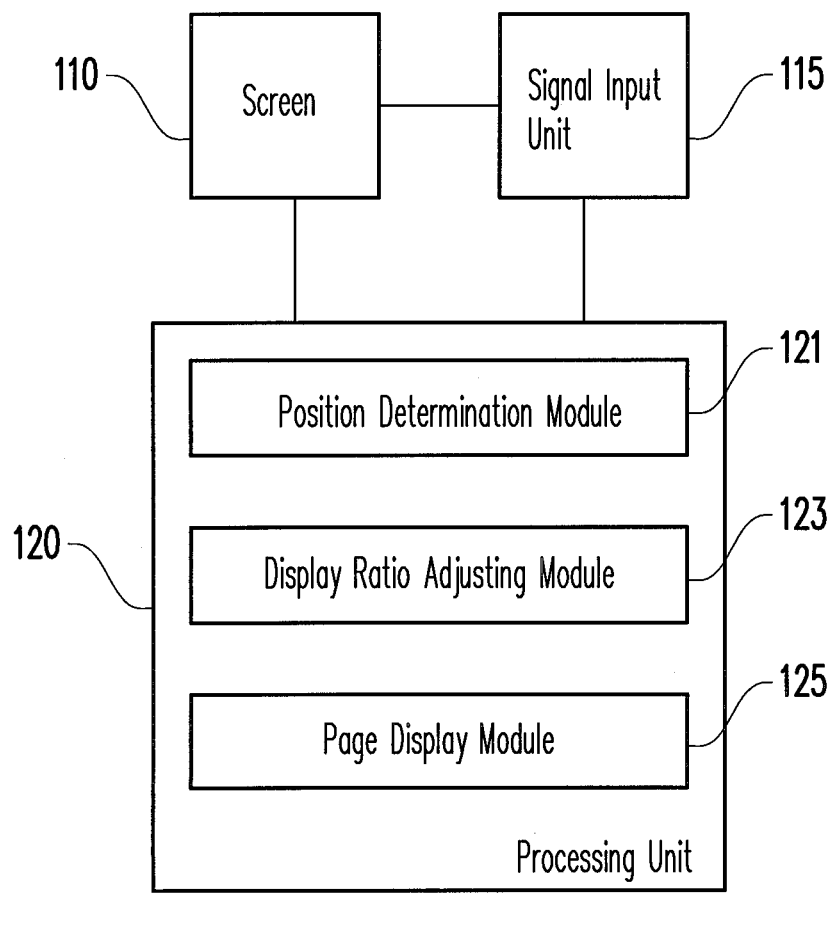
FIG. 1 is a block diagram of a mobile electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a mobile electronic device according to an embodiment of the present invention. Referring to FIG. 1, the mobile electronic device 100 includes a screen 110, a signal input unit 115, and a processing unit 120. The mobile electronic device 100 may be a cell phone, a personal digital assistant (PDA) phone, or a smartphone; however, the scope of the mobile electronic device 100 is not limited in the present invention. Below, the functions of foregoing units of the mobile electronic device 100 will be described.

The screen 110 may be a general display or a touch screen (e.g. a resistive touch screen or a capacitive touch screen) and which is served as a display interface of the mobile electronic device 100. The signal input unit 115 may be a touch panel or a mouse for receiving a scaling signal generated by the operation of a user. For example, if the signal input unit 115 is a touch panel, the user can touch the touch panel by using an input tool (for example, a finger or a stylus) to generate the scaling signal, and if the signal input unit 115 is a mouse, the user can generate the scaling signal by moving the mouse. In the present embodiment, the screen 110 displays pages opened by the user through a web browser (for example, Microsoft Internet Explorer) or other file inspection tools (for example, Microsoft Office Word Viewer, Windows Picture and Fax Viewer, etc). These pages could be different types of files of different formats. In other words, a page opened by the user contains at least one of a text, a picture, and a multimedia file.

The processing unit 120 connected to the screen 110 and the signal input unit 115 may be a processor or any chipset with calculation and processing capabilities. In the present embodiment, the processing unit 120 includes a position determination module 121, a display ratio adjusting module 123, and a page display module 125. The position determination module 121 determines whether a scaling signal is located within a specific area of the screen 110. The display ratio adjusting module 123 adjusts the display ratio of a page currently displayed on the screen 110 according to the variation of the scaling signal when the scaling signal is located within the specific area. The page display module 125 displays the other open pages on the screen 110 along with the currently displayed page when the display ratio is smaller than or equal to a specific ratio, wherein the specific ratio may be an original ratio (for example, 100%) or a minimum ratio which is smaller than the original ratio.

For example, when a user opens a file through a file inspection tool, the file inspection tool correspondingly displays a page on the screen 110 for presenting the content of the file. When the user opens multiple files at the same time, the file inspection tool displays multiple pages for respectively presenting the content of each of the files. Through the operations of different modules in the processing unit 120, the size of the page (could be one or multiple pages) currently displayed on the screen 110 is changed according to the scaling signal received by the signal input unit 115. In an embodiment of the present invention, the other pages opened by the file inspection tool are also displayed on the screen 110 when the display ratio of the page is reduced to be smaller than the original ratio. In another embodiment of the present invention, the other open pages are only displayed on the screen 110 when the display ratio of the page is reduced to be equal to the minimum ratio.

Figure 2:
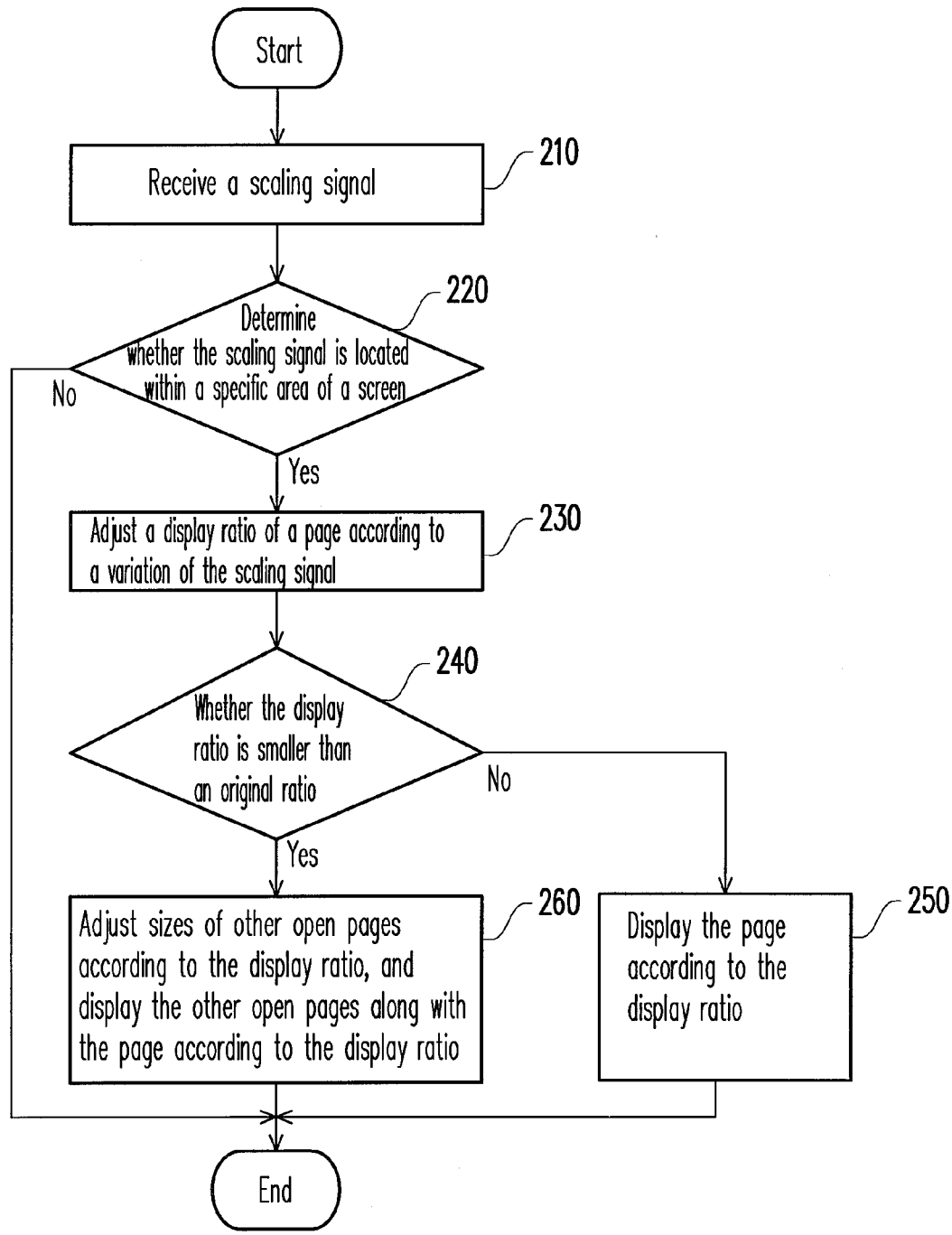
FIG. 2 is a flowchart of a method for adjusting a page display manner according to an embodiment of the present invention.

Below, the operation of the mobile electronic device 100 will be described in detail with reference to an embodiment of the present invention. FIG. 2 is a flowchart of a method for adjusting a page display manner according to an embodiment of the present invention. Referring to both FIG. 1 and FIG. 2, in the present embodiment, a page is currently displayed on the screen 110, and the page contains at least one of a text, a picture, and a multimedia file. First, in step 210, the signal input unit 115 receives a scaling signal generated by an operation of a user.

Then, in step 220, the position determination module 121 in the processing unit 120 determines whether the scaling signal is located within a specific area of the screen 110, wherein the specific area may be a marginal area, a central area, or any predetermined area on the screen 110; however, the scope of the specific area is not limited in the present invention. The position determination module 121 may determine whether the scaling signal is located within the specific area of the screen 110 through the comparison of coordinates. After that, in step 230, the display ratio adjusting module 123 adjusts the display ratio of the page currently displayed on the screen 110 according to the variation of the scaling signal.

In an embodiment of the present invention, the display ratio adjusting module 123 first obtains a displacement and a direction of a track produced by the scaling signal and then adjusts the display ratio of the page according to the displacement and the direction. For example, the display ratio adjusting module 123 defines two directions (for example, a leftward and a rightward direction, an upward and a downward direction, or a clockwise and an anticlockwise direction, etc) in advance, wherein the two predetermined directions are respectively corresponding to the operations for enlarging and diminishing a page. When the track of the scaling signal matches one of the predetermined directions, the display ratio adjusting module 123 determines whether to enlarge or diminish the page according to the corresponding direction and determines the adjustment to be made on the display ratio according to the displacement (for example, the greater the displacement is, the more the display ratio is adjusted). It should be noted that the track of the scaling signal may be a straight line or a curve; however, the pattern of the track is not limited in the present invention.

In another embodiment of the present invention, the display ratio adjusting module 123 uninterruptedly obtains the displacement and direction of the track produced by the scaling signal to linearly adjust the display ratio of the page. To be specific, a smooth and continues page scaling effect can be achieved by constantly obtaining the displacement and direction of the track and adjusting the display ratio accordingly.

In yet another embodiment of the present invention, the display ratio adjusting module 123 adjusts the display ratio according to an occurrence number of the scaling signal. Namely, the display ratio adjusting module 123 determines the value of the display ratio according to the number of operations performed by the user to the signal input unit 115. It has to be stated herein that the adjustment methods described above are only taken as examples of the present invention but not for limiting the scope of the present invention, and the display ratio adjusting module 123 may adjust the display ratio of the page according to any variation of the scaling signal.

Thereafter, in step 240, whether the current display ratio is smaller than the original ratio is determined. If the display ratio is greater than or equal to the original ratio, in step 250, the page display module 125 displays the page on the screen 110 according to the display ratio. To be specific, the page display module 125 individually displays the complete content of the page on the screen 110 when the display ratio is equal to the original ratio. Namely, the screen 110 is used for displaying a single page, and the user can browse the complete content of the page on the screen 110. When the display ratio is adjusted to be greater than the original ratio, the page display module 125 enlarges the page according to the display ratio and displays part of the page on the screen 110. As a result, the user can inspect the enlarged portion of the page conveniently.

Next, if it is determined in step 240 that the display ratio is smaller than the original ratio, in step 260, the page display module 125 adjusts the sizes of the other open pages according to the display ratio and displays the other open pages on the screen 110 along with the page according to the display ratio. To be specific, the page display module 125 first diminishes the currently displayed page and the other open pages according to the display ratio and then displays the diminished page on the screen 110 and the other open pages in the area of the screen 110 other than the display area of the page.

For example, if the user opens three pages in advance, then after step 260, the three pages are all displayed on the screen 110. In an embodiment of the present invention, the three pages are displayed on the screen 110 in a 3-dimensional circular manner. In another embodiment of the present invention, the three pages are displayed side by side on the screen 110. However, the display manner of the other open pages is not limited in the present invention.

However, in an embodiment of the present invention, the page display module 125 displays the other open pages on the screen 110 only when the display ratio of the page is reduced to be equal to the minimum ratio (the minimum ratio is smaller than the original ratio).

If the signal input unit 115 receives another scaling signal after the other open pages are displayed along with the current page, the page display module 125 first determines whether the current display ratio is equal to the minimum ratio and then switches one of the open pages according to the direction of the scaling signal if the display ratio is equal to the minimum ratio.

It should be mentioned that if the screen of the mobile electronic device 100 is a touch screen, the touch screen can be served as both the screen 110 and the signal input unit 115 described above. Thus, when the user is about to adjust the size of the page currently displayed in the touch screen, the user simply touches a specific area of the touch screen, and the display ratio of the page changes along with the movement of the user's finger (or stylus). The user can see the other open pages when the display ratio of the page is reduced to be smaller than the original ratio (or equal to the minimum ratio). Accordingly, the user does not need to remember which pages are opened and the contents in these pages. Instead, the user can directly inspect all the open pages and switch between the open pages through the touch screen by simply reducing the display ratio of the current page to smaller than the original ratio (or equal to the minimum ratio). Since foregoing operations can be accomplished through only the touch screen, the inspection and switching of the pages are made very convenient.

Figure 3:
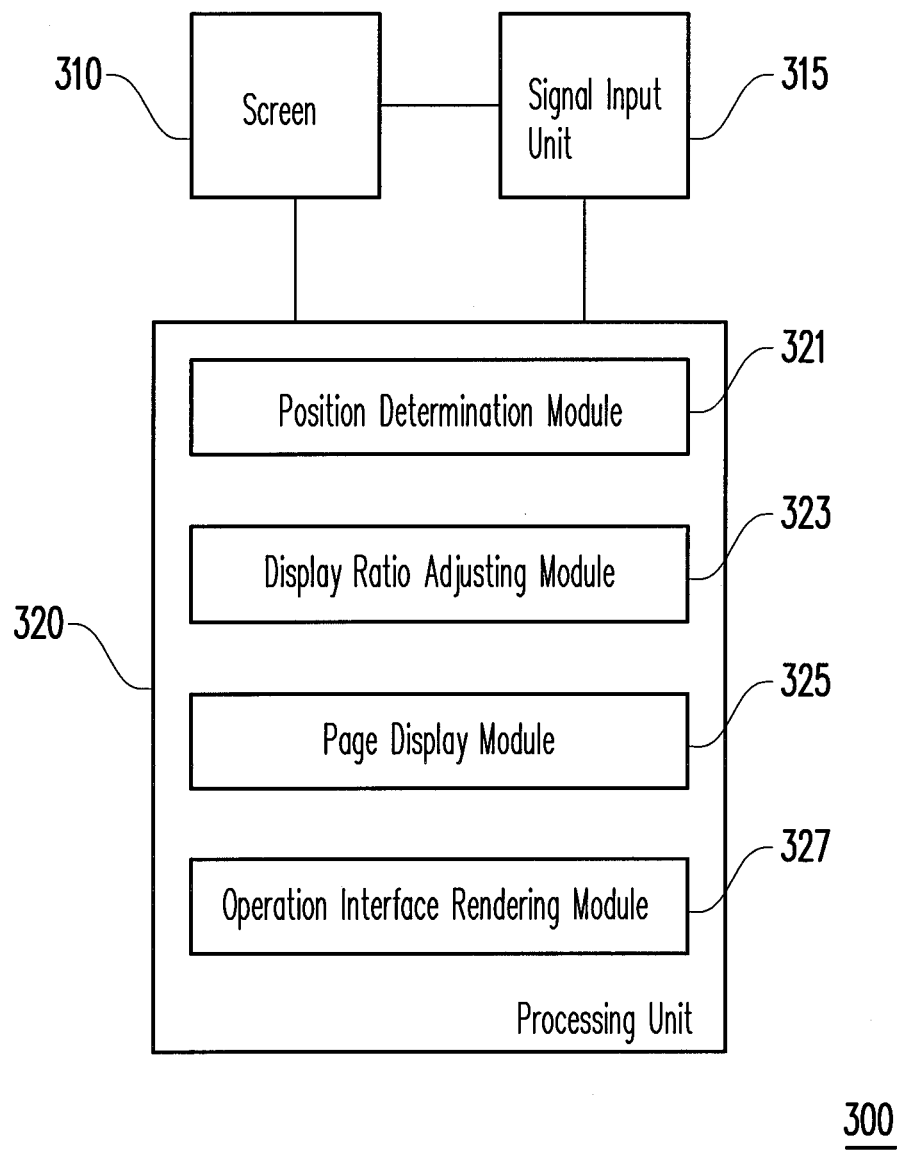
FIG. 3 is a block diagram of a mobile electronic device according to another embodiment of the present invention.

FIG. 3 is a block diagram of a mobile electronic device according to another embodiment of the present invention. In the present embodiment, the screen 310, the signal input unit 315, the processing unit 320, and the position determination module 321, the display ratio adjusting module 323, and the page display module 325 in the processing unit 320 of the mobile electronic device 300 have the same or similar functions as those of the mobile electronic device 100 illustrated in FIG. 1 therefore will not be described herein. Below, the operation of the mobile electronic device 300 will be described with reference to an embodiment of the present invention, and meanwhile, the function of an operation interface rendering module 327 will also be described.

Figure 4A:
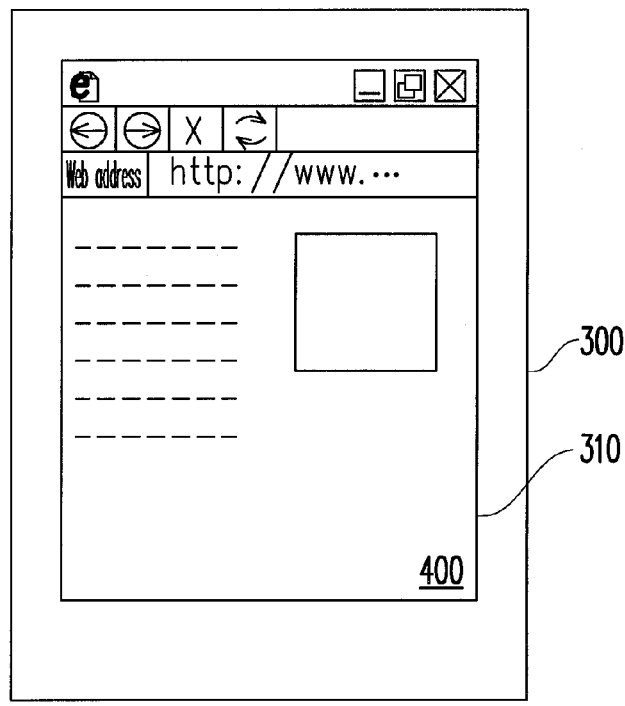
FIGS. 4A, 4B, 4C, 4D, and 4E illustrate the appearance of a touch screen of a mobile electronic device according to an embodiment of the present invention.
Figure 4B:
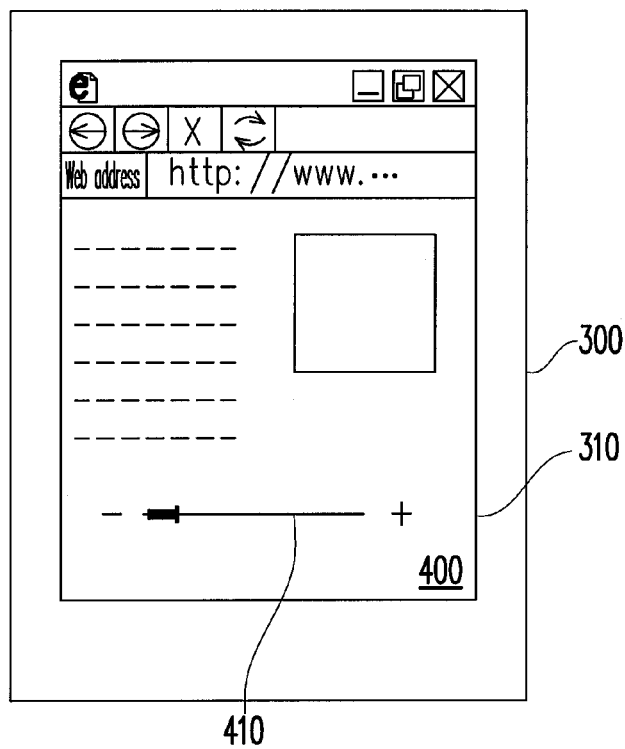

In the present embodiment, the appearance of the mobile electronic device 300 is illustrated in FIG. 4A, wherein a webpage (i.e., a page 400) opened by a user through a web browser is currently displayed on the screen 310 in an original ratio. The user first operates the signal input unit 315 (a touch panel or a mouse) when the user is about to adjust the size of the page 400. After the signal input unit 315 receives the aforementioned scaling signal (referred to as a first scaling signal), the operation interface rendering module 327 displays a page scale prompt on the screen 310 to notify the user that the next scaling signal will start a page scaling function. In the present embodiment, the page scale prompt may be a picture, a text message, or an operation interface component of any format (for example, a roll scroll bar, a Fraxel touch knob, or a touch button); however, the scope of the page scale prompt is not limited in the present invention. For the convenience of description, the page scale prompt is assumed to be a narrower roll scroll bar, as the page scale prompt 410 shown in FIG. 4B. The narrower roll scroll bar can prompt the user to perform a page scaling operation and which does not produce any interference when the user browses the content of the page 400.

Figure 4C:
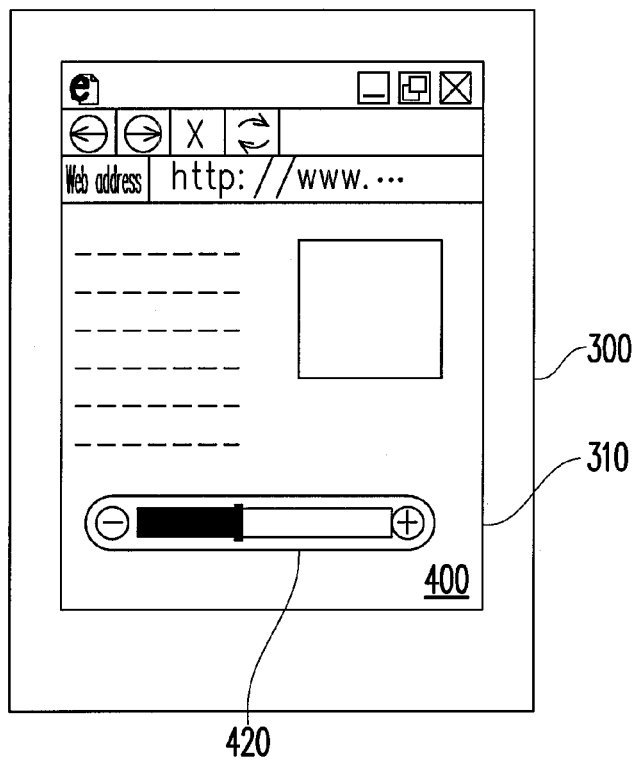

In the present embodiment, the display area of the page scale prompt 410 is defined as a specific area. Thus, when the user is about to resize the page 400, the user can operate on the page scale prompt 410 by using the signal input unit 315 so as to generate a scaling signal (referred to as a second scaling signal) in the specific area. Then, the operation interface rendering module 327 displays a page scale adjusting interface on the screen 310 such that the user can conveniently adjust the size of the page 400. The page scale adjusting interface may be a roll scroll bar, a Fraxel touch knob, or a touch button; however, the scope of the page scale adjusting interface is not limited in the present invention. However, in the present embodiment, the appearances of the page scale adjusting interface and the page scale prompt rendered by the operation interface rendering module 327 are corresponding to each other. Thus, the page scale adjusting interface displayed after the second scaling signal is received may be a wider roll scroll bar (as the page scale adjusting interface 420 shown in FIG. 4C).

Since the page scale adjusting interface 420 has a large display area, the user can conveniently perform operations on the page scale adjusting interface 420 through the signal input unit 315. The signal input unit 315 receives a corresponding scaling signal according to the operation performed by the user on the page scale adjusting interface 420, and the display ratio adjusting module 323 correspondingly adjusts the display ratio of the page 400. The method for adjusting the display ratio is the same as or similar to the method described in foregoing embodiment therefore will not be described herein. Next, the page display module 325 adjusts the size of the page 400 according to the display ratio.

Figure 4D:
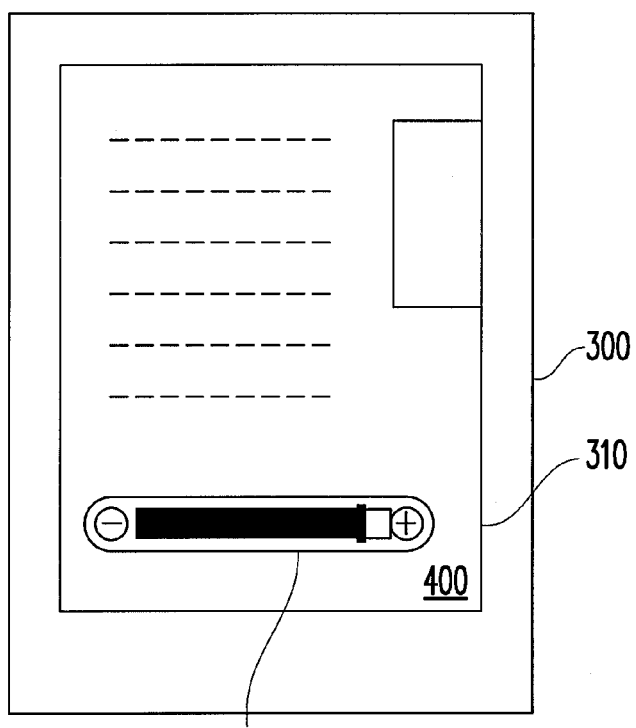
Figure 4E:
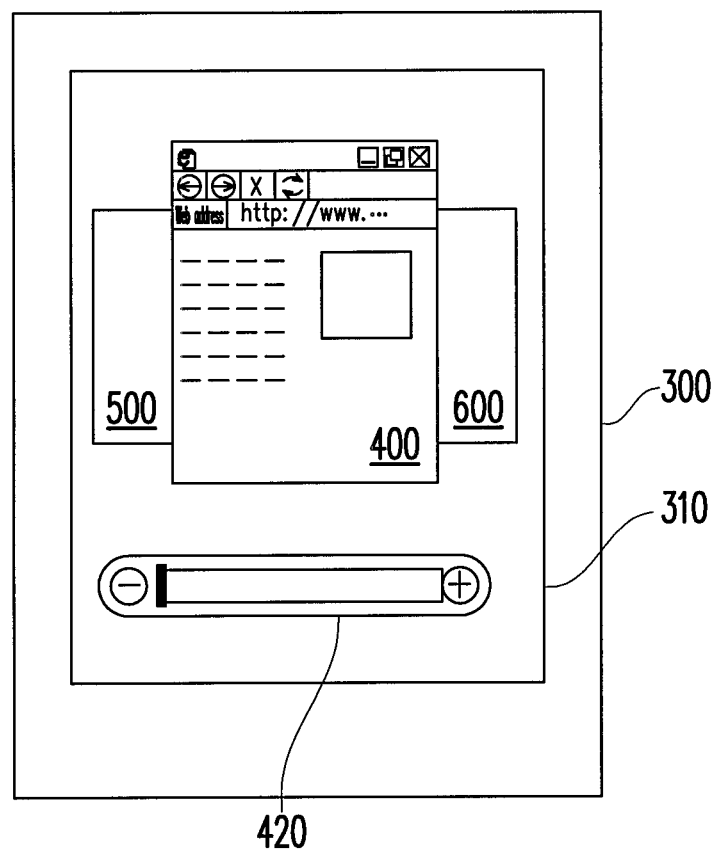

To be specific, the size of the page 400 is changed when the user moves the scroll bar on the page scale adjusting interface 420. For example, when the user moves the scroll bar on the page scale adjusting interface 420 to adjust the display ratio of the page 400 to be greater than the original ratio, the page 400 is enlarged as shown in FIG. 4D such that the user can clearly inspect the enlarged content of the page 400. When the user moves the scroll bar on the page scale adjusting interface 420 again to adjust the display ratio to be smaller than the original ratio, the page is as shown in FIG. 4E. Besides the page 400, the other open pages (i.e., a page 500 and a page 600) are also displayed on the screen 310. Accordingly, the user can conveniently inspect the open pages and at the same time, see the contents in the other pages. However, it should be stated that the arrangement of pages as shown in FIG. 4E is only an example of the present invention but not for limiting the scope thereof.

If the mobile electronic device 300 is disposed with a touch screen, the touch screen can be served as both the screen 310 and the signal input unit 315 in foregoing embodiment. Thus, if the current display ratio is adjusted by the user to be the minimum ratio, the user can switch between the pages 400, 500, and 600 by moving the input tool on the screen 310.

It should be mentioned that regardless of whether the page 400 is currently displayed on the screen 310 in the original ratio, the user can always adjust the size of the page 400 through the operations described above. In other words, the user does not need to press other buttons on the mobile electronic device 300; instead, the user can resize the currently displayed page, display all the open pages, and switch between all the open pages through only the signal input unit 315. Besides, the page scale prompt 410 and the page scale adjusting interface 420 having the corresponding appearances are very easy to use and will not interfere when the user browses the currently displayed page. As a result, the user can conveniently browse the pages by using the mobile electronic device 300.

The present invention further provides a storage medium. The storage medium records a plurality of program instruction segments (for example, a setting program instruction section and a deployment program instruction section, etc). These program instruction sections are loaded into the mobile electronic device and executed by the same to accomplish foregoing method for adjusting a page display manner and to allow the mobile electronic device to accomplish the functions described in foregoing embodiments. The storage medium can be any data storage device (for example, a read-only memory, a random access memory, a tape, a floppy disk, a hard disk, a CD, or a transmission medium, etc), the type of the storage medium is not limited in the present invention. On the other hand, the program instruction segments records in the storage medium can be accessed through a network.

To be specific, a user can directly obtain the storage medium containing the program instruction segments and load the program instruction sections into a mobile electronic device so that the mobile electronic device can execute the method for adjusting a page display manner described in foregoing embodiments. Besides, the user can also download the program instruction sections in the storage medium into a mobile electronic device through a client-server or peer-to-peer (P2P) network (a cable network or a wireless network). The mobile electronic device can provide a function for adjust a page display manner by executing the program instruction sections.

As described above, the present invention provides a method for adjusting a page display manner, a mobile electronic device, and a storage medium, wherein a user can adjust the page display manner by using a single signal input unit. Since all the operations of resizing a page, displaying all open pages, and switching between the open pages can be accomplished through a single signal input unit, page adjustment is made very convenient and no interruption will be produced when the user browses the content of the page.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adjusting a page display manner, suitable for adjusting a page displayed in a screen, the method comprising:
   receiving a first scaling signal;
   displaying a page scale prompt, and serving a display area of the page scale prompt as a specific area of the screen;
   receiving a second scaling signal;
   determining whether the second scaling signal is located within the specific area;
   adjusting a display ratio of the page on the screen according to a variation of a third scaling signal if the second scaling signal is located within the specific area; and
   displaying other open pages along with the page if the display ratio is smaller than or equal to a specific ratio.

2. The method according to claim 1, wherein after the step of determining whether the second scaling signal is located within the specific area, the method further comprises:
   displaying a page scale adjusting interface for receiving the third scaling signal if the second scaling signal is located within the specific area; and
   adjusting the display ratio of the page on the screen according to the variation of the third scaling signal.

3. The method according to claim 2, wherein after the step of displaying the other open pages along with the page, the method further comprises:
   receiving a fourth scaling signal;
   determining whether the display ratio is equal to a minimum ratio; and
   switching one of the open pages according to a direction of the fourth scaling signal if the display ratio is equal to the minimum ratio.

4. The method according to claim 1 further comprising:
   adjusting sizes of the other open pages according to the display ratio.

5. The method according to claim 1, wherein the specific ratio comprises an original ratio and a minimum ratio, and the minimum ratio is smaller than the original ratio.

6. The method according to claim 5, wherein after the step of adjusting the display ratio of the page, the method further comprises:
   individually displaying a complete content of the page on the screen when the display ratio is equal to the original ratio.

7. The method according to claim 5, wherein after the step of adjusting the display ratio of the page, the method further comprises:
   enlarging the page according to the display ratio and displaying a partial content of the page on the screen when the display ratio is greater than the original ratio.

8. The method according to claim 5 further comprising:
   diminishing the page and the other open pages according to the display ratio when the display ratio is smaller than the original ratio or equal to the minimum ratio;
   displaying the page on the screen; and
   displaying the other open pages in an area of the screen other than a display area of the page.

9. A mobile electronic device, comprising:
   a screen;
   a signal input unit, coupled to the screen, for receiving a scaling signal; and
   a processing unit, coupled to the screen and the signal input unit,
   wherein when the signal input unit receives a first scaling signal, the processing unit displaying a page scale prompt, and serves a display area of the page scale prompt as a specific area of the screen, when the signal input unit receives a second scaling signal, the processing unit determines whether the second scaling signal is located within the specific area, adjusts a display ratio of the page on the screen according to a variation of a third scaling signal if the second scaling signal is located within the specific area, and displays other open pages along with the page if the display ratio is smaller than or equal to a specific ratio.

10. The mobile electronic device according to claim 9, wherein the processing unit displays a page scale adjusting interface on the screen when the second scaling signal is located within the specific area, and when the signal input unit receives the third scaling signal, the processing unit adjusts the display ratio of the page on the screen according to the variation of the third scaling signal.

11. The mobile electronic device according to claim 10, wherein when the signal input unit receives a fourth scaling signal, the processing unit determines whether the display ratio is equal to a minimum ratio and switches one of the open pages according to a direction of the fourth scaling signal if the display ratio is equal to the minimum ratio.

12. The mobile electronic device according to claim 9, wherein the processing unit adjusts sizes of the other open pages according to the display ratio.

13. The mobile electronic device according to claim 9, wherein the specific ratio comprises an original ratio and a minimum ratio, and the minimum ratio is smaller than the original ratio.

14. The mobile electronic device according to claim 13, wherein the processing unit enlarges the page according to the display ratio and displays a partial content of the page on the screen when the display ratio is greater than the original ratio.

15. The mobile electronic device according to claim 13, wherein the processing unit diminishes the page and the other open pages according to the display ratio, displays the page on the screen, and displays the other open pages in an area of the screen other than a display area of the page when the display ratio is smaller than the original ratio or equal to the minimum ratio.

16. A non-transitory storage medium, for storing a plurality of program instructions, wherein the program instructions are suitable for being loaded into a mobile electronic device with a screen to execute:
receiving a first scaling signal;
displaying a page scale prompt, and serving a display area of the page scale prompt as a specific area of the screen;
receiving a second scaling signal;
determining whether the second scaling signal is located within the specific area;
adjusting a display ratio of the page on the screen according to a variation of a third scaling signal if the second scaling signal is located within the specific area; and
displaying other open pages along with the page if the display ratio is smaller than or equal to a specific ratio.

* * * * *